July 31, 1923.
G. C. CARSON ET AL
WALL CONSTRUCTION
Filed April 17, 1922
1,463,759
2 Sheets-Sheet 1
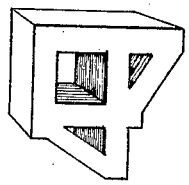
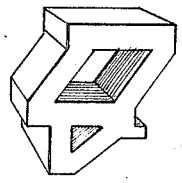
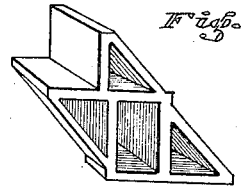
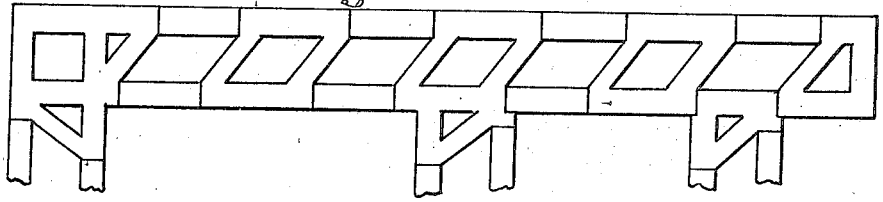
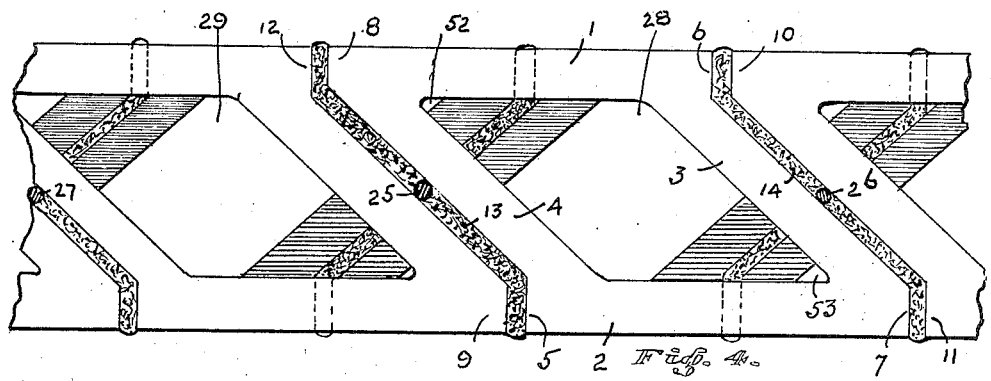
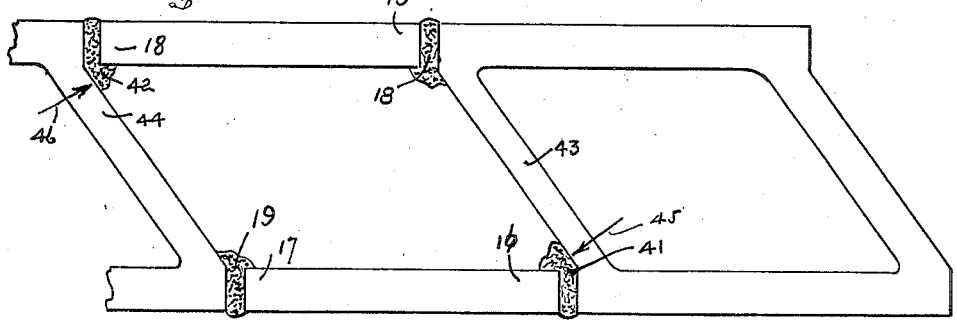
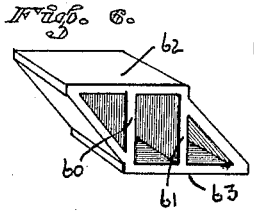
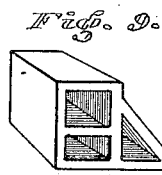

Patented July 31, 1923.

1,463,759

UNITED STATES PATENT OFFICE.

GEORGE C. CARSON AND EDWARD COLL, OF SAN FRANCISCO, AND THOMAS S. CHRISTENSEN, OF NASHMEAD, CALIFORNIA.

WALL CONSTRUCTION.

Application filed April 17, 1922. Serial No. 553,625.

*To all whom it may concern:*

Be it known that we, GEORGE CAMPBELL CARSON and EDWARD COLL, citizens of the United States, and residents of the city and county of San Francisco, State of California, and THOMAS S. CHRISTENSEN, a citizen of the United States, and resident of Nashmead, Mendocino County, California, have invented a new and useful Improvement in Wall Constructions, of which the following is a specification.

Our invention relates to a means and method of constructing, tying, bracing and bonding the walls and columns of a building structure so as to produce the greatest strength, secure the maximum amount of space in the center of the walls or columns, to effect insulation against heat, cold and moisture or to provide space for concrete or other filling, with the use of the minimum amount of material. Moreover, by our invention a large saving is made in time and labor in the building operations.

Our invention consists of a hollow building block of special form, a plurality of which blocks when built into a structure present wall surfaces with angular positioned struts crossing between said surfaces and with right angle abutting ends between the blocks for the mortar joints, which ends merge into the adjacent angle strut and which strut forms a backing to reinforce the joint.

By the angle strut the stiffness of the finished structure is increased in that the mortar joints are formed with one end surface as a continuation of the strut member and not offset therefrom as in other forms.

Our block in its simplest form is of a general parallelogram shape in its horizontal cross section, with the corners of the parallelogram cut away at the acute angles and with the corners built out at the obtuse angles to provide right angle mortar receiving surfaces for the abutments of adjacent blocks either of the same or other forms.

For special uses, as for wall ends, corners pilasters, angle walls, etc., we employ forms of a general angular or modified shape or a combination of parallelogram or square and angular shape, always, however, maintaining the surfaces adapted to receive the connecting mortar as a continuation of an angular strut.

The invention consists of traversing the hollow space in the wall structure diagonally with the walls of a hollow form, so as to bond the sides of the hollow space and each member adjoining the hollow form, in such
a manner that the sides are tied and braced,
and every member used in the method, bonds and is bonded by the hollow form.

In a structure composed of our blocks, the hollow passageways through the several blocks are superimposed thereby producing a continuous opening through the blocks of consecutive tiers, which continuous opening may be filled with concrete, reinforcing members or both, or may be utilized as a duct which may be used for the introduction of pipes, wires or the like.

Figure 1 shows in perspective, one of our blocks for a wall corner and with angle projections for starting the side walls therefrom.

Fig. 2 shows in plan a building wall having a corner, an end, a right angle outside wall, and two partition walls to better show the several forms of blocks employing our invention.

Fig. 3 is a perspective view of one of our blocks adapted to build into a wall and with angular member for starting a branch wall.

Fig. 4 is a plan of part of a wall comprising our parallelogram blocks and with a tier of similar blocks below showing the crossing of the strut members in consecutive tiers, and the manner and means by which the connecting mortar is reinforced and strength of joints secured, and the manner of placing reinforcing rods which enables the laying of the blocks into position without interfering with the rods.

Fig. 5 is similar to Fig. 4 except that in place of alternate blocks a pair of front and rear spacing plates are introduced.

Figs. 6, 7, 8, 9, 10, 11, show several forms of building blocks most generally used in employing our invention.

Figure 10:
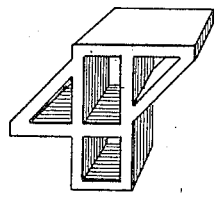
Figure 11:
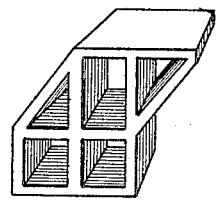
Figure 13:
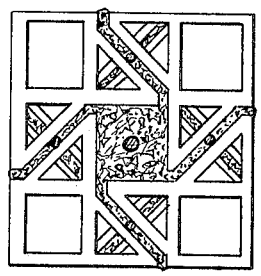
Figure 12:
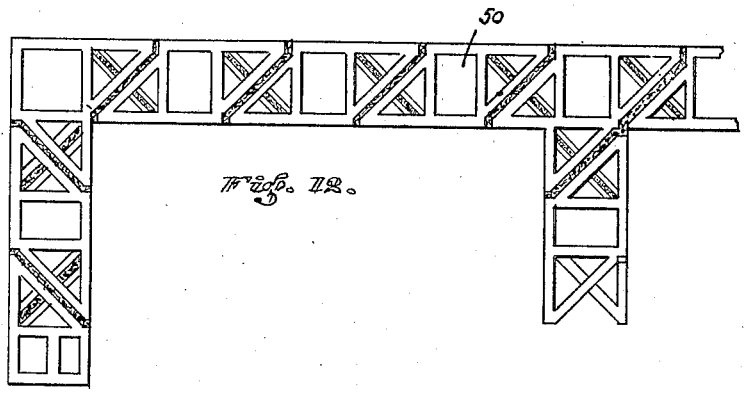
Figure 14:
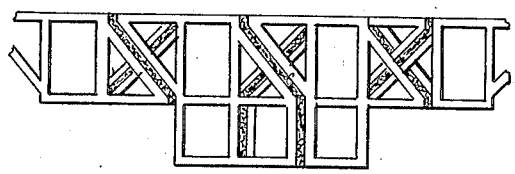

Figs. 12, 13, 14, show in plan section structures built from the blocks shown in Figs. 4, 6 to 11 inclusive, and indicate the manner in which the reinforcing is employed.

Throughout the figures similar numerals refer to identical parts.

Referring particularly to Figs. 4 and 5 the numerals 1 and 2 indicate the exposed or front surfaces of one of our building blocks in simple form. At 3 and 4 are shown the strut or angle brace members which join together the Nos. 1 and 2. At 5, 6, 7 and 8 are shown ends or abutments against which the corresponding ends of other blocks are adapted to be connected by mortar, cement, or in any conventional way where the plurality of our blocks are joined adjacent each other as indicated in Fig. 4. The corresponding ends of adjacent blocks are indicated by the numerals 9, 10 and 11, 12, respectively, and the mortar between the blocks is indicated at 13, 14, whereas when flat tiles are employed between alternate blocks such as shown in Fig. 4 a plan section of such a structure is indicated in Fig. 5 and the ends of said tiles are shown by the numerals 15, 16, 17, 18.

In building a wall of our blocks we reverse the blocks in alternate tiers so that the strut or angle braces will cross each other as indicated in Fig. 4. In this way the blocks of successive tiers, whether the wall be built up of members as indicated in Figs. 4 or 5, will present a stagger appearance in which the joints will be broken at each block and the angle struts crossing each other in successive tiers will secure a most rigid integral construction. Vertical reinforcing rods may be passed through the intersecting joints as indicated at 25 and 26 if desired and there will be a vertical opening throughout the height of the wall; that is, passing through every tier as shown at 28, 29.

At 50, Fig. 12 is shown one of the ducts or passageways which is formed by the openings in superimposed blocks and into which we may cast plastic material, mortar, concrete or the like, with or without reinforcing rods, or some of these passageways may be so used and others may be employed as ducts or conduits for pipes, wires or the like. This rectangular form of opening is produced by the block shown by a plurality of superimposed blocks as shown in Fig. 6 but a duct or passageway although of somewhat smaller dimensions may also be formed by employing the type of block shown in Fig. 4 and in the corner piece of Fig. 1. If it is desired to utilize the duct space 28 for molding therein a column, post or tier for reinforcing and otherwise forming a part of such wall it is advantageous to close the openings 52, 53, by forming the several members 1, 2, 3, 4, that go to make up the blocks with a thickness, thus eliminating the said openings 52, 53, and closing the duct 28 from any outlets, through which plastic material might otherwise flow.

Attention is directed to the struts 60, 61, of Fig. 6 which will be noted meet the front members 62, 63, at right angles and at a point intermediate the ends thereof. In this way these struts 60, 61, not only support the block during its molding, burning, etc., and other steps of the process of manufacture and handling but also support the otherwise flat elements 62, 63 against structural strains in the building that might otherwise tend to distort or break the said face members.

Referring now to the mortar joint 41, 42, of Fig. 5 it will be seen that the mortar is reinforced by the struts 42 and 43, resisting any tendency to distortion or breakage in the direction of the arrows 45, 46, respectively, so that the plate ends 16, 17, are held not only against end movement but also against any lateral displacement and therefore the mortar joints 18, 19, at the ends 17, 15, are thus prevented from working loose.

We claim:

1. A hollow building block comprising two parallel faces, struts joining the ends of the faces at an acute and an obtuse angle respectively and joining surfaces adapted to be joined to adjacent blocks positioned at the intersection of the faces and at right angles with the said faces, whereby said surfaces lie in relatively displaced planes.

2. A hollow building block formed of molded material having parallel sides laterally displaced and a plurality of ends lying in displaced parallel planes at right angles to said surfaces, and a brace member between each pair of parallel ends and forming an acute angle therewith.

GEORGE C. CARSON.
THOMAS S. CHRISTENSEN.
EDWARD COLL.